US009638325B2

(12) United States Patent
Arisawa et al.

(10) Patent No.: US 9,638,325 B2
(45) Date of Patent: May 2, 2017

(54) MATERIAL FOR GASKET

(71) Applicant: NICHIAS CORPORATION, Tokyo (JP)

(72) Inventors: Takumi Arisawa, Tokyo (JP); Hideharu Aoyagi, Tokyo (JP); Kenichiro Ishikawa, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 168 days.

(21) Appl. No.: 14/372,705

(22) PCT Filed: Jan. 16, 2013

(86) PCT No.: PCT/JP2013/050659
§ 371 (c)(1),
(2) Date: Jul. 16, 2014

(87) PCT Pub. No.: WO2013/108779
PCT Pub. Date: Jul. 25, 2013

(65) Prior Publication Data
US 2014/0363679 A1    Dec. 11, 2014

(30) Foreign Application Priority Data
Jan. 17, 2012 (JP) ................................ 2012-020292

(51) Int. Cl.
| | | |
|---|---|---|
| B32B 15/06 | (2006.01) | |
| B32B 25/14 | (2006.01) | |
| C08F 214/22 | (2006.01) | |
| C08K 3/36 | (2006.01) | |
| C08K 5/053 | (2006.01) | |
| F16J 15/12 | (2006.01) | |
| F16J 15/08 | (2006.01) | |
| C09K 3/10 | (2006.01) | |
| B32B 15/18 | (2006.01) | |
| B32B 25/08 | (2006.01) | |
| B32B 25/16 | (2006.01) | |
| B32B 27/20 | (2006.01) | |
| B32B 27/42 | (2006.01) | |
| C08F 214/20 | (2006.01) | |

(52) U.S. Cl.
CPC .......... *F16J 15/0818* (2013.01); *B32B 15/06* (2013.01); *B32B 15/18* (2013.01); *B32B 25/08* (2013.01); *B32B 25/16* (2013.01); *B32B 27/20* (2013.01); *B32B 27/42* (2013.01); *C09K 3/1009* (2013.01); *B32B 2264/102* (2013.01); *B32B 2264/104* (2013.01); *B32B 2264/107* (2013.01); *B32B 2264/108* (2013.01); *B32B 2307/714* (2013.01); *B32B 2581/00* (2013.01); *B32B 2605/00* (2013.01); *C08F 214/20* (2013.01); *C08F 214/205* (2013.01); *C08K 3/36* (2013.01); *C08K 5/053* (2013.01); *C09K* *2003/1068* (2013.01); *C09K 2200/0247* (2013.01); *F16J 2015/0856* (2013.01); *Y10T 428/31544* (2015.04)

(58) Field of Classification Search
None
See application file for complete search history.

(56) References Cited

U.S. PATENT DOCUMENTS

| | | | | |
|---|---|---|---|---|
| 4,151,342 | A  * | 4/1979 | Uchino | ............... C08F 214/267 428/500 |
| 2003/0176576 | A1 | 9/2003 | Fujita et al. | |
| 2003/0232919 | A1 * | 12/2003 | Osawa | ................. C08G 65/007 524/588 |
| 2004/0195781 | A1 | 10/2004 | Saito et al. | |
| 2004/0214944 | A1 * | 10/2004 | Tomihashi | ............... C08K 5/13 524/544 |
| 2006/0100374 | A1 | 5/2006 | Hamada et al. | |

FOREIGN PATENT DOCUMENTS

| | | |
|---|---|---|
| CN | 1430638 A | 7/2003 |
| CN | 101201107 A | 6/2008 |
| JP | 62-104863 A | 5/1987 |
| JP | 3-227622 A | 10/1991 |

(Continued)

OTHER PUBLICATIONS

Machine translation of JP 2006-218629, Aug. 2006.*
Office Action issued in corresponding Chinese application 201380005645.8 on Aug. 24, 2015.
International Search Report issued in corresponding application PCT/JP2013/050659, completed Feb. 6, 2013 and mailed Feb. 19, 2013.
English translation of International Preliminary Report on Patentability issued in corresponding application PCT/JP2013/050659 on Jul. 22, 2014.

(Continued)

*Primary Examiner* — Ramsey Zacharia
(74) *Attorney, Agent, or Firm* — Griffin and Szipl PC

(57) ABSTRACT

A material for a gasket, wherein a chromate or non-chromate film, a phenol resin primer layer and a polyol-crosslinkable fluororubber layer are formed on one or both surfaces of a steel plate in this sequence from the side of the steel plate; the polyol-crosslinkable fluororubber layer is a rubber layer obtained by applying a fluororubber composition that comprises fluororubber, a polyol-based cross-linking agent, an amine-based cross-linking accelerator and silica to the phenol resin primer layer, followed by heating; and the amine-based cross-linking accelerator is a tertiary amine or a salt of a tertiary amine obtained by a reaction between a tertiary amine and an acid. Provided is a material for a gasket mounted in an engine of a vehicle that, in the actual use environment, does not suffer rubber peeling in a part where it contacts water or an anti-freezing solution even if the gasket is used in a state where it contacts different types of metals and, in a sealing part around a combustion room, abrasion or ply separation of a rubber layer hardly occurs.

8 Claims, No Drawings

(56) References Cited

FOREIGN PATENT DOCUMENTS

| JP | 2002-264253 | A | 9/2002 |
| JP | 2005-226064 | A | 8/2005 |
| JP | 2006-070132 | A | 3/2006 |
| JP | 2006-218629 | A | 8/2006 |
| JP | 4566535 | B2 | 10/2010 |
| JP | 2010-275560 | A | 12/2010 |

\* cited by examiner

MATERIAL FOR GASKET

This is a National Phase Application in the United States of International Patent Application No. PCT/JP2013/050659 filed Jan. 16, 2013, which claims priority on Japanese Patent Application No. 2012-020292, filed Jan. 17, 2012. The entire disclosures of the above patent applications are hereby incorporated by reference.

TECHNICAL FIELD

The invention relates to a material for a gasket.

Conventionally, for a gasket mounted in an engine of a vehicle, in particular, for a head gasket, a gasket material in which a chromate film composed of a chromium compound, phosphoric acid and silica is formed on one or both surfaces of a steel plate, and a rubber layer is stacked on the chromate film has been widely used (Patent Document 1).

However, in recent years, for environmental problems, a material for a gasket in which a non-chromate film is used instead of a chromate film has come to be used widely (Patent Document 2).

A non-chromate film is required to have liquid-resistant adhesion property to water or an anti-freezing solution to a level that can compare favorably with a material for a gasket provided with a chromate film.

As examples of the non-chromate film having excellent liquid-resistant adhesion property, in Patent Document 3, as the material for a gasket in which a non-chromate film is provided, formation of a surface-treated layer composed of silica and a reaction product of an acid component and a metal or a reaction product of an acid component and a metal oxide on one or both surfaces of a steel plate is disclosed.

RELATED ART DOCUMENTS

Prior Art Document

Patent Document 1: JP-A-H03-227622 (claims)
Patent Document 2: JP-A-2002-264253 (claims)
Patent Document 3: Japan Patent No. 4566535 (claims)

SUMMARY OF THE INVENTION

Problems to be Solved by the Invention

However, in the case of the material for a gasket disclosed in Patent Document 3, in the actual use environment, in particular when used as a head gasket of an aluminum-made engine, since different types of metals are brought into contact with each other in an electrolyte as an anti-freezing solution, a cell reaction occurs between an aluminum-made engine (anode side) and a gasket steel plate (cathode side), whereby adhesion strength is lowered.

Since a head gasket is used in a severe environment such as high temperature, high bearing pressure and excitation, in a sealing part around a combustion room, a problem tends to occur that combustion gas, an anti-freezing solution, an oil or the like are leaked due to abrasion of a rubber layer or interlayer separation of a rubber layer and a primer layer. In particular, in polyol cross-linking of fluororubber, when a phosphonium salt-based cross-linking accelerator is used, interlayer adhesion of a rubber layer and a primer layer becomes insufficient, whereby rubber tends to be peeled easily in a sealing environment around a combustion chamber.

In view of the above, an object of the invention is to provide a material for a gasket mounted in an engine of a vehicle that, in the actual use environment, does not suffer rubber peeling in a part that contacts water or an anti-freezing solution even if the gasket is used in a state where it contacts different types of metals, and in a sealing part around a combustion room, abrasion or interlayer separation of a rubber layer hardly occurs.

Means for Solving the Subject

The subject of the invention can be solved by the invention described below.

That is, the invention provides a material for a gasket, wherein a chromate or non-chromate film, a phenol resin primer layer and a polyol-crosslinkable fluororubber layer are formed on one or both surfaces of a steel plate in this sequence from the side of the steel plate;

the polyol-crosslinkable fluororubber layer is a rubber layer obtained by applying a fluororubber composition that comprises fluororubber, a polyol-based cross-linking agent, an amine-based cross-linking accelerator and silica to the phenol resin primer layer, followed by heating; and the amine-based cross-linking accelerator is a tertiary amine or a salt of a tertiary amine obtained by a reaction between a tertiary amine and an acid.

Advantageous Effects of the Invention

According to the invention, it is possible to provide a material for a gasket mounted in an engine of a vehicle that, in the actual use environment, does not suffer rubber peeling in a part that contacts water or an anti-freezing solution even if the gasket is used in a state where it contacts different types of metals, and, in a sealing part around a combustion room, abrasion or interlayer separation of a rubber layer hardly occurs.

MODE FOR CARRYING OUT THE INVENTION

The material for a gasket of the invention is a material for a gasket, wherein a chromate or non-chromate film, a phenol resin primer layer and a polyol-crosslinkable fluororubber layer are formed on one or both surfaces of a steel plate in this sequence from the side of the steel plate;

the polyol-crosslinkable fluororubber layer is a rubber layer obtained by applying a fluororubber composition that comprises fluororubber, a polyol-based cross-linking agent, an amine-based cross-linking accelerator and silica to the phenol resin primer layer, followed by heating; and the amine-based cross-linking accelerator is a tertiary amine or a salt of a tertiary amine obtained by a reaction between a tertiary amine and an acid.

No specific restrictions are imposed on the steel plate used in the material for a gasket of the invention, and as examples thereof, stainless (ferrite-based stainless/martensite-based stainless/austenite-based stainless), ferrum, aluminum or the like can be given.

The chromate film used in the material for a gasket of the invention is a film formed on the stainless steel, and is a film that contains a chromium compound. No specific restrictions are imposed on the chromate film, as long as it is a film that contains a chromium compound. The chromium compound is a compound that contains a chromium atom, e.g. an oxide of a chromium atom, a hydroxide of a chromium atom, or a fluoride of a chromium. In addition to the chromium compound, the chromate film may contain other compounds (shown below) than chromium compounds.

The non-chromate film used in the material for a gasket of the invention is a film formed on a steel plate, and is made of a compound other than a chromium compound. As the non-chromate film, no specific restrictions are imposed as far as it is made of a compound other than a chromium compound. As the compound other than the chromium compound that forms a non-chromate film, a compound that contains Si, P, Al, Zr, Ti, Zn and Mg or the like can be given. A non-chromic compound such as an oxide, a hydroxide, a fluoride or the like of these atoms can be given. As a preferable non-chromate film, one that comprises a compound which at least contains one or two or more of Si, P, Al and Zr and is composed of a compound other than a chromium compound can be given. A non-chromate film composed only of a compound containing one or two or more of Si, P, Al and Zr can preferably be given.

As the method for forming a chromate film or a non-chromate film on the steel plate, a method can be given in which a processing liquid that contains the above-mentioned chromium compound or compound other than the chromium compound is applied to one or both surfaces of a steel plate by means of a known application means such as a roll coater, followed by drying at a temperature of about 150 to 250° C. The coating amount of the chromate film or the non-chromate film is not particularly restricted, but in practical viewpoint, the amount is preferably about 50 to 500 mg/m$^2$.

The phenol resin primer layer used in the material for a gasket of the invention is a resin layer composed of a phenol resin. No specific restrictions are imposed on the phenol resin in the primer layer. A novolac-type phenol resin, a resole-type phenol resin or the like can be given. Among these, a novolac-type phenol resin is preferable. A phenol resin may be used alone or in combination of two or more.

As the method for forming a phenol resin primer layer on a chromate film or a non-chromate film, the following method can be given, for example. A prescribed amount of a phenol resin is weighed, and dissolved in an appropriate solvent. The resulting processing liquid is applied onto a chromate film or a non-chromate film by means of a known applicator such as a roll coater, followed by heating at a temperature of about 120° C. to 250° C. In such a method, during heating, the chromate film or the non-chromate film is firmly adhered to the phenol-resin primer layer. No specific restrictions are imposed on the thickness of the phenol resin primer layer. However, it is preferably about 1 to 10 μm from practical point of view. A processing liquid for forming the phenol resin primer layer may contain a coupling agent. In this case, the amount of a coupling agent relative to the solid matters in the processing liquid is preferably 0.5 to 20 mass %.

The polyol-crosslinkable fluororubber layer used in the material for a gasket of the invention is a rubber layer obtained by applying a fluororubber composition comprising fluororubber, a polyol-based cross-linking agent, an amine-based cross-linking accelerator and silica to a phenol-resin primer layer, followed by heating, in which the amine-based cross-linking accelerator is a tertiary amine or a salt of a tertiary amine obtained by reaction of a tertiary amine and an acid.

The fluororubber in the fluororubber composition is fluororubber that is polyol-crosslinkable with a polyol cross-linking agent. As such fluororubber, one that has been well known in the art can be widely used. For example, a vinylidene fluoride/hexafluoropropylene-based copolymer, a vinylidene fluoride/hexafluoropropylene/tetrafluoroethylene-based copolymer, a tetrafluoroethylene/propylene/vinylidene fluoride-based copolymer or the like can be given.

No specific restrictions are imposed on the polyol cross-linking agent used in the fluororubber composition as far as it is crosslinkable through a reaction with fluororubber. As the polyol cross-linking agent, bisphenols are preferable. As specific examples of the polyol cross-linking agent, a polyhydroxy aromatic compound such as 2,2-bis(4-hydroxyphenyl)propane [bisphenol A], 2,2-bis(4-hydroxyphenyl)perfluoropropane [bisphenol AF], 1,3-dihydroxybenzene, 4,4'-dihydroxydiphenyl, 4,4'-dihydroxydiphenylmethane, 2,2-bis(4-hydroxyphenylbutane); an alkali metal salt or an alkaline earth metal salt thereof can be given. Among them, bisphenol A, bisphenol AF, an alkali metal salt or alkaline earth metal salt thereof are preferable.

The content of the polyol cross-linking agent in the fluororubber composition is appropriately selected according to the type or the like of the fluororubber. Normally, the content is 0.5 to 10 parts by mass, preferably 2 to 8 parts by mass, relative to 100 parts by mass of the fluororubber.

The amine-based cross-linking accelerator used in the fluororubber composition is a tertiary amine or a salt of a tertiary amine. The salt of a tertiary amine of the amine-based cross-linking accelerator is a salt of a tertiary amine obtained by reaction between a tertiary amine and an acid, and is a salt formed of a tertiary ammonium cation in which a hydrogen ion of an acid is added to a tertiary amine and a counter anion of a hydrogen ion of the acid. The tertiary amine used as the amine-based cross-linking accelerator is an amine having an acid dissociation constant (pKa) of 8.5 to 14, preferably 11 to 14. The tertiary amine as the raw material of a salt of a tertiary amine used as an amine-based cross linking accelerator is an amine having an acid dissociation constant pKa of 8.5 to 14, preferably 11 to 14. The acid dissociation constant pKa of the tertiary amine is a value at 25° C. when water is used as a solvent.

As the tertiary amine used as the amine-based cross linking accelerator, no specific restrictions are imposed as long as the acid dissociation constant is in the above-mentioned range. As examples, 1,8-diazabicyclo(5,4,0)undecene-7[DBU], 1,5-diazabicyclo(4,3,0)nonene-5[DBN], 1,4-diazabicyclo(2,2,2)octane[DABCO], trimethylamine, triethylamine or the like can be given. As the tertiary amine as the raw material of a salt of a tertiary amine used as the amine-based cross-linking accelerator, no specific restrictions are imposed as long as the acid dissociation constant is in the above-mentioned range. As examples, 1,8-diazabicyclo(5,4,0)undecene-7[DBU], 1,5-diazabicyclo(4,3,0)nonene-5[DBN], 1,4-diazabicyclo(2,2,2)octane[DABCO], trimethylamine, triethylamine or the like can be given.

As the salt of a tertiary amine used as the amine-based cross-linking accelerator, a salt of 1,8-diazabicyclo(5,4,0) undecene-7[DBU] and a salt of 1,5-diazabicyclo(4,3,0)nonene-5[DBN] can be given, for example. No specific restrictions are imposed on the type of a salt of DBU or DBN, a DBU-phenol salt (a salt obtained by reacting DBU and phenol), a DBU-octylic acid salt (a salt obtained by reacting DBU and octylic acid), a DBU-toluenesulfonic acid salt (a salt obtained by reacting DBU and toluenesulfonic acid), a DBU-formic acid salt (a salt obtained by reacting DBU and formic acid), a DBN-octylic acid salt (a salt obtained by reacting DBN and octylic acid) or the like can be given. Further, as other examples of a salt of a tertiary amine used as the amine-based cross-linking accelerator, a trimetylamine salt or a triethylamine salt can be given, for example. The amine-based cross-linking accelerator may be used alone or in combination of two or more.

No specific restrictions are imposed on the amount of the amine-based cross-linking accelerator in the fluororubber composition, and the amount is appropriately selected such that the cross-linking speed that is suitable for the manufacturing conditions can be attained.

As the cross-linking accelerator, the fluororubber composition may contain a quaternary phosphonium salt-based cross-linking accelerator in addition to the amine-based cross-linking accelerator.

As for the silica used in the fluororubber composition, synthetic silica that has been conventionally known can be used. The synthetic silica may be either wet silica synthesized by a wet method or dry silica synthesized by a dry method. A combination of wet silica and dry silica may also be used. The wet silica is not particularly restricted. For example, Nipsil AQ, Nipsil VN3, Nipsil LP, Nipsil ER, Nipsil NA, Nipsil K-500, Nipsil E-200, Nipsil E-743, Nipsil E-74P, Nipsil SS-10, Nipsil SS-30P, Nipsil SS-100 (each was manufactured by Tosoh Silica Corporation) or the like can be given. The dry silica is not particularly restricted. For example, Aerosil 50, Aerosil 130, Aerosil 200, Aerosil 300, Aerosil 380, Aerosil R972, Aerosil TT600, Aerosil MOX80, Aerosil MOX 170 (each was manufactured by Nippon Aerosil Co., Ltd.) or the like can be given. Since a silanol group having a high acidity is present on the surface of silica, silica can neutralize a hydroxide ion formed by a cathode reaction, whereby peeling of rubber can be suppressed.

The content of silica in the fluororubber composition is preferably 1 to 200 parts by mass, and especially preferably 10 to 100 parts by mass, relative to 100 parts by mass of the fluororubber. If the content of silica in the fluororubber composition is in the above-mentioned range, effects of suppressing rubber peeling can be enhanced. If the content of silica in the fluororubber composition is outside the above-mentioned range, cross-linking reaction of rubber is inhibited, whereby initial adhesion properties may tend to be low.

In addition to the above-mentioned components, as the cross-linking accelerator aid, the fluororubber composition may contain magnesium oxide or calcium hydroxide. The fluororubber composition may further contain a filler such as carbon black, calcium carbonate, clay, wollastonite, mica and talc or the like.

The fluororubber composition is an un-crosslinked rubber composition that contains fluororubber, a polyol-based cross-linking agent, an amine-based cross-linking accelerator, silica and other components that are used according to need. The fluororubber composition can be obtained by melt kneading fluororubber, a polyol-based cross-linking agent, an amine-based cross-linking accelerator, silica and other components that are used according to need, for example.

The polyol-crosslinkable fluororubber layer is a rubber layer obtained by a method in which a fluororubber composition is applied to a phenol resin primer layer, followed by heating. As the method for forming a polyol-crosslinkable fluororubber layer on a phenol resin primer layer, for example, a method can be given in which a fluororubber composition is prepared, the composition is then dissolved or dispersed in an organic solvent, or each component of a fluororubber composition is dissolved or dispersed in an organic solvent, thereby to prepare a fluororubber composition liquid, and then, the fluororubber composition liquid is applied to the phenol resin primer layer by means of a knife coater, by means of a roll coater, by screen printing or the like, thereby to apply the fluororubber composition, followed by heating to conduct a cross-linking reaction by the polyol cross-linking agent, whereby a polyol-crosslinkable fluororubber layer is formed.

No specific restrictions are imposed on the organic solvent as long as it can dissolve or disperse the fluororubber composition. For example, a ketone-based organic solvent such as methyl ethyl ketone, methyl propyl ketone, methyl butyl ketone, methyl isobutyl ketone and diisobutyl ketone or the like is preferable. In respect of coating properties, the content of the fluororubber composition in the fluororubber composition liquid is preferably 10 to 50 mass % relative to the total amount of the fluororubber composition.

In the above-mentioned production method, in order to improve the adhesion between the phenol resin primer layer and the polyol-crosslinkable fluororubber layer, when the fluororubber composition liquid is prepared, it is possible to add a coupling agent to the fluororubber composition liquid. No specific restrictions are imposed on the coupling agent, and an amine-based silane coupling agent is preferable. As the amine-based silane coupling agent, 3-triethoxysilyl-N-(1,3-dimethyl-dibutylidene)propylamine, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane or the like can be given. The amount of the silane coupling agent added to the fluororubber composition liquid is preferably 1 to 5 parts by mass relative to 100 parts by mass of the fluororubber. No specific restrictions are imposed on the thickness of the coating layer of the fluororubber composition liquid. However, since the thickness of the polyol-crosslinkable fluororubber layer is preferably 15 to 30 μm, the fluororubber composition liquid is applied such that the thickness of the fluororubber composition layer after the cross linking by heating will be in the above-mentioned range. Further, as for the heating conditions at which a cross-linking reaction is conducted by heating the fluororubber composition layer, it is preferred that the heating temperature be 150 to 200° C. and that the heating time be 5 to 30 minutes in order to attain favorable cross linking.

The material for a gasket of the invention is preferably used as a gasket mounted in an engine of a vehicle, in particular as a head gasket.

EXAMPLES

The invention will be explained in detail with reference to the following Examples and Comparative Examples, which should not be construed as limiting the scope of the invention.

<Preparation of Sample>

To the both surfaces of a stainless steel plate that was subjected to alkali degreasing, a processing liquid for forming a non-chromate film that contained Si, P, Al and Zr and did not contain Cr was applied by means of a roll coater, and the resulting coating film was dried at 180° C., whereby a non-chromate film was formed. Subsequently, to the non-chromate film, a liquid (solid matter concentration: 5%) obtained by dissolving a novolac-type phenol resin (PR-12987, manufactured by Sumitomo Bakelite Co., Ltd.) in methyl ethyl ketone was applied, followed by a heat treatment, whereby a phenol resin primer layer was formed. Subsequently, on the phenol resin primer layer, a fluororubber composition liquid (solid matter concentration: 30%) obtained by mixing a fluororubber composition shown in Table 1 with methyl ethyl ketone was applied by means of a roll coater, and cross linking by heating was conducted at 200° C. for 10 minutes to form a polyol-crosslinkable fluororubber layer, whereby a material for a gasket was obtained.

<Evaluation Method>

The material for a gasket thus obtained was evaluated for (1) battery reaction test and (2) heat compression vibration test, explained below.

(Battery Reaction Test)

A sample in which the stainless steel plate was exposed by peeling the rubber layer at the end portion of the material for a gasket and the end portion of an aluminum plate was connected by a lead, and then kept at 90° C. for 500 hours in a 5% aqueous sodium sulfite solution in a half-immersed state such that they did not contact with each other. The sample was then taken out, and the surface of the sample was scratched such that a grid pattern (interval: 2 mm) was formed. As a result, 100 grids were formed. A cross cut tape peeling test was conducted, and the number of grids remained was evaluated.

(Heat Compression Vibration Test)

A material for a gasket and a shim plate were stacked. In this stacked state, they were mounted in a flange. In a state where they were compressed by heating at 230° C., vibration with a prescribed frequency was applied, and the contact pressure was periodically changed in a range from 8 MPa to 140 MPa. After the test, the flange was opened, and for a portion to which the shim was pressed, peeling of the rubber layer of the material for a gasket was evaluated for the following criteria:

<<Criterion of Evaluation>>

5: Rubber layer was not subjected to flow deformation or peeling

4: Rubber layer was slightly subjected to flow deformation

3: Rubber layer was apparently subjected to flow deformation, but the steel plate was not exposed 2: Rubber layer was slightly subjected to flow deformation, but the steel plate was exposed.

1: Rubber layer was apparently subjected for flow deformation, and the steel plate was exposed.

<Results>

The results of the examination are shown in Table 1. In Examples 1 to 5, no rubber peeling was observed in the battery reaction test and the heat compression vibration test. On the other hand, in Comparative Example 1, in which no silica was compounded, rubber peeling was observed in the battery reaction test. In Comparative Example 2 in which a phosphonium salt-based cross-linking accelerator was used, rubber peeling was observed in the heat compression vibration test.

TABLE 1

|  | Example 1 | Example 2 | Example 3 | Example 4 | Example 5 | Com. Ex. 1 | Com. Ex. 2 |
| --- | --- | --- | --- | --- | --- | --- | --- |
| Rubber composition (part by mass) | | | | | | | |
| Fluororubber | 100 | 100 | 100 | 100 | 100 | 100 | 100 |
| MT carbon | 30 | 30 | 30 | 30 | 30 | 30 | 30 |
| Wet silica | 10 | 20 | 40 | 20 | — | — | 20 |
| Dry silica | — | — | — | — | 20 | — | — |
| Calcium hydroxide | 6 | 6 | 6 | 6 | 6 | 6 | 6 |
| Magnesium oxide | 3 | 3 | 3 | 3 | 3 | 3 | 3 |
| Polyol cross-linking agent | 6 | 6 | 6 | 6 | 6 | 6 | 6 |
| DBU salt-based cross-linking accelerator | 1 | 1 | 1 | — | 1 | 1 | — |
| DBN salt-based cross-linking accelerator | — | — | — | 1 | — | — | — |
| Phosphonium salt-based cross-linking accelerator | — | — | — | — | — | — | 1.5 |
| Performance test | | | | | | | |
| Battery reaction test | 100/100 | 100/100 | 100/100 | 100/100 | 100/100 | 10/100 | 100/100 |
| Heat compression vibration test | 5 | 5 | 5 | 5 | 5 | 5 | 1 |

<<Components in Table 1>>
Fluororubber: Viton E45 manufactured by Du Pont Kabushiki Kaisha
MT carbon: Thermax N990 manufactured by Cancarb Ltd.
Wet silica: Nipsil ER manufactured by Tosoh Silica Corporation
Dry silica: Aerosil 200 manufactured by Nippon Aerosil Co., Ltd.
Calcium hydroxide: Cal-em manufactured by Ohmi Chemical Industry Co., Ltd.
Magnesium oxide: Kyowa-mag#150 manufactured by Kyowa Chemical Industry Co., Ltd.
Polyol cross-linking agent: Curative #30 manufactured by Du Pont Kabushiki Kaisha
DBU salt-based cross-linking accelerator: U-CAT SA506 manufactured by San-Apro Ltd.
DBN salt-based cross-linking accelerator: U-CAT 1102 manufactured by San-Apro Ltd.
Phosphonium salt-based cross-linking accelerator: Curative #20 manufactured by Du Pont Kabushiki Kaisha

INDUSTRIAL APPLICABILITY

Since it is possible to obtain a material for a gasket that does not suffer peeling of rubber in a portion that is in contact with water or an anti-freezing solution even when the gasket is used in a state where it is in contact with different types of metal, the invention can be applied to gasket applications.

The invention claimed is:

1. A material for a gasket, wherein a chromate or non-chromate film, a phenol resin primer layer and a polyol-crosslinked fluororubber layer are formed on one or both surfaces of a steel plate in this sequence from the side of the steel plate;
   the polyol-crosslinked fluororubber layer is a rubber layer obtained by applying a fluororubber composition that comprises fluororubber, a polyol-based cross-linking agent, an amine-based cross-linking accelerator and silica to the phenol resin primer layer, followed by heating;
   the polyol-based cross-linking agent is selected from the group consisting of polyhydroxy aromatic compounds selected from 2,2-bis(4-hydroxyphenyl)propane, 2,2-bis(4-hydroxyphenyl)perfluoropropane, 1,3-dihydroxybenzene, 4,4'-dihydroxydiphenyl, 4,4'-dihydroxydiphenylmethane, and 2,2-bis(4-hydroxyphenyl) butane; and alkali metal salts and alkaline earth metal salts thereof;

the amine-based cross-linking accelerator is a tertiary amine or a salt of a tertiary amine having an acid dissociation constant (pKa) of 8.5 to 14, obtained by a reaction between a tertiary amine and an acid;

the fluororubber is at least one selected from the group consisting of a vinylidene fluoride/hexafluoropropylene-based copolymer, a vinylidene fluoride/hexafluoropropylene/tetrafluoroethylene-base copolymer, and a tetrafluoroethylene/propylene/vinylidene fluoride-based copolymer;

a content of the silica in the polyol-crosslinked fluororubber layer is 10 to 40 parts by mass per 100 parts by mass of the fluororubber.

2. The material for a gasket according to claim 1, wherein the non-chromate film comprises a compound that at least includes one or two or more atoms of Si, P, Al and Zr.

3. The material for a gasket according to claim 1, wherein the amine-based cross-linking accelerator is a 1,8-diazabicyclo(5,4,0)undecene-7 salt or a 1,5-diazabicyclo(4,3,0)nonene-5 salt.

4. The material for a gasket according to claim 1, wherein the phenol resin primer layer consists essentially of a phenol resin and, optionally, a coupling agent.

5. The material for a gasket according to claim 1, wherein a content of the polyol cross-linking agent is 0.5 to 10 parts by mass relative to 100 parts by mass of the fluororubber.

6. The material for a gasket according to claim 1, wherein the fluororubber composition further comprises calcium hydroxide.

7. The material for a gasket according to claim 1, wherein, when a gasket comprising the material is mounted in an engine of a vehicle and the gasket is used in a state where the gasket contacts a different type of a metal, rubber peeling does not occur in a part that contacts water or an anti-freezing solution.

8. A material for a gasket, wherein a chromate or non-chromate film, a phenol resin primer layer and a polyol-crosslinked fluororubber layer are formed on one or both surfaces of a steel plate in this sequence from the side of the steel plate;

the polyol-crosslinked fluororubber layer is a rubber layer obtained by applying a fluororubber composition that comprises fluororubber, a polyol-based cross-linking agent, an amine-based cross-linking accelerator and silica to the phenol resin primer layer, followed by heating;

the amine-based cross-linking accelerator is a tertiary amine or a salt of a tertiary amine obtained by a reaction between a tertiary amine and an acid; and the fluororubber is at least one selected from the group consisting of a vinylidene fluoride/hexafluoropropylene-based copolymer, a vinylidene fluoride/hexafluoropropylene/tetrafluoroethylene-base copolymer, and a tetrafluoroethylene/propylene/vinylidene fluoride-based copolymer, wherein the phenol resin primer layer consists of a phenol resin and, optionally, a coupling agent.

* * * * *